(12) United States Patent
Anderson

(10) Patent No.: US 6,311,995 B1
(45) Date of Patent: Nov. 6, 2001

(54) VEHICLE SUSPENSION SYSTEM

(75) Inventor: Mark Anderson, Biglerville, PA (US)

(73) Assignee: GVM, Inc., Biglerville, PA (US)

( * ) Notice: Subject to any disclaimer, the term of this patent is extended or adjusted under 35 U.S.C. 154(b) by 0 days.

(21) Appl. No.: 09/498,202

(22) Filed: Feb. 4, 2000

(51) Int. Cl.$^7$ ........................................... B60G 9/02
(52) U.S. Cl. ............................ 280/124.11; 280/124.116
(58) Field of Search ............... 280/124.111, 124.112, 280/124, 113, 124.116, 124.128; 180/349, 352

(56) References Cited

U.S. PATENT DOCUMENTS

| | | |
|---|---|---|
| 2,510,424 | 6/1950 | Shook . |
| 3,273,912 | 9/1966 | Crockett . |
| 3,292,943 | 12/1966 | Crockett . |
| 3,311,186 | 3/1967 | Kamlukin . |
| 3,414,290 | 12/1968 | Wilfert et al. . |
| 3,420,543 | * 1/1969 | Strifler et al. ............ 280/124.112 |
| 3,426,862 | 2/1969 | Wilfert . |
| 3,473,821 | 10/1969 | Barenyi et al. . |
| 4,398,617 | 8/1983 | Crabb et al. . |
| 4,647,067 | 3/1987 | Paquette et al. . |
| 4,725,073 | 2/1988 | Sano et al. . |
| 5,005,856 | 4/1991 | Shibahata . |
| 5,180,112 | 1/1993 | Hoyle . |
| 5,310,212 | 5/1994 | Uno et al. . |
| 5,458,359 | * 10/1995 | Brandt ............ 280/124.111 |
| 5,924,711 | 7/1999 | Schote . |

* cited by examiner

*Primary Examiner*—Peter C. English
(74) *Attorney, Agent, or Firm*—McNees Wallace & Nurick LLC; Mitchell A. Smolow; Carmen Santa Maria

(57) ABSTRACT

The invention discloses a first and second leading arm, each leading arm having a first end opposed to a second end, a pivot pin having a first end which is opposed to a second end and a walking beam having first and second ends. The walking beam is pivotally attached to the pivot pin first end at a location between the walking beam first and second ends. The pivot pin second pin is fixedly attached to a cross-member which is fixedly attached to a vehicle frame. The first leading arm first end is pivotally attached to the walking beam first end and the first leading arm second end is fixedly attached to an axle. The second leading arm first end is pivotally attached to the walking beam second end and the second leading arm second end is fixedly attached to an axle. The horizontal plane of the first and second leading arms are substantially parallel to level ground and a shock assembly is fixedly attached between the axle and the vehicle frame.

21 Claims, 4 Drawing Sheets

VEHICLE SUSPENSION SYSTEM

BACKGROUND OF THE INVENTION

1. Field of the Invention

The present invention relates to vehicle suspensions and, more specifically, to farm vehicle suspensions which enable a farm vehicle to negotiate very rough and uneven ground.

2. Description of the Prior Art

Off road vehicles, and in particular farm vehicles, have to negotiate very rough and uneven terrain. Farming vehicles often transport heavy loads such as fertilizer, seeds, and liquids for spreading or spraying, often times carrying heavy weights high above the vehicle's center of gravity. In order to maintain vehicle stability with these heavy loads, it is important that all four wheels contact the ground continuously while the vehicle frame, and thus, the load maintain level travel.

Suspension systems utilizing a trailing arm portion to absorb vehicle motion forces are commonly known. For example, U.S. Pat. No. 2,510,424 to Shook is directed to a suspension comprising two trailing arms hinged at one end to a substantially U-shaped laterally tiltable member. The trailing arms are hinged at the other end to a housing located at the inner sides of the wheels. There are separate axles journaled in a housing. The housing is pivotally attached to the center of a crossbar. The trailing arms connect to the U-shaped member at a level well above the connection to the axle. This high angle of attachment imposes greater sheer stress on the pin connecting the trailing arm to the U-shaped member than would a trailing arm positioned in a plane substantially parallel to level ground.

U.S. Pat. No. 3,426,862 to Wilfert relates to a drive axle for vehicles, the relevant part comprising two trailing arms rotatably connected at one end by pins to a transversely disposed tubular shaped housing. The housing is rigidly connected in a cross-like manner with another tubularly shaped housing part that is pivotal about the vehicle longitudinal axis. The second tubular shaped housing supports the drive axle and the trailing arms are secured at the other end to the wheel carriers. Guide links above and below the driving half shafts are used as cross-guide members, while the axle gear is rigidly or elastically mounted to the frame. These joints where the two housings connect are more likely to weaken and/or fail than would a one-piece unit.

What is needed is a suspension system that minimizes stress on the connecting points, while allowing all four vehicle wheels to independently maintain contact with the ground and simultaneously keep the vehicle frame level, thereby permitting increased weight loads to remain stable while traversing uneven terrain.

SUMMARY OF THE INVENTION

The present invention is directed to a vehicle suspension apparatus that satisfies the need to provide substantially stress free connecting points, allow all vehicle wheels to independently maintain contact with the ground throughout all types of terrain, and at the same time continuously maintain a level frame, thus leading to increased vehicle load stability.

In one form, the present invention has a first and second leading arm, each leading arm having a first end opposed to a second end, a pivot pin having a first end which is opposed to a second end and a walking beam having first and second ends. The walking beam is pivotally attached to the pivot pin first end at a location between the walking beam first and second ends. The pivot pin second end is fixedly attached to a cross-member which is fixedly attached to a vehicle frame.

The first leading arm first end is pivotally attached to the walking beam first end and the first leading arm second end is fixedly attached to an axle. The second leading arm first end is pivotally attached to the walking beam second end and the second leading arm second end is fixedly attached to an axle. The horizontal plane of the first and second leading arms are substantially parallel to level ground and a plurality of shock assemblies are fixedly attached between the axle and the vehicle frame.

In another form, the plurality of shock assemblies are omitted.

In yet another form, the present invention comprises a first and second leading arm, each leading arm having a first end opposed to a second end, a first and second trailing arm, each trailing arm having a first end opposed to a second end, a first walking beam having first and second ends, a second walking beam having first and second ends, and one or more pivot pins. The pivot pins are fixedly attached to a cross-member which is fixedly attached to a vehicle frame in a manner such that a first extending end of the pivot pin extends outward from a first side of the cross-member and a second extending end of the pivot pin extends outward from an opposing side of the cross-member.

The first walking beam is pivotally attached to the pivot pin first extending end at a location between the first walking beam first and second ends, and the second walking beam is pivotally attached to the pivot pin second extending end at a location between the second walking beam first and second ends.

The first leading arm first end is pivotally attached to the first walking beam first end and the first leading arm second end is fixedly attached to an axle. The second leading arm first end is pivotally attached to the first walking beam second end and the second leading arm second end is fixedly attached to an axle. The first trailing arm first end is pivotally attached to the second walking beam first end and the first trailing arm second end is fixedly attached to an axle. The second trailing arm first end is pivotally attached to the second walking beam second end and the second trailing arm second end is fixedly attached to an axle.

The horizontal plane of the leading and trailing arms are substantially parallel to level ground and a plurality of shock assemblies are fixedly attached between the axle and the vehicle frame.

In another form of the invention, the shock assemblies are omitted.

An advantage of the present invention is that by maintaining the leading and trailing arms substantially parallel to level ground, sheering forces at the pivotal attachment points are substantially reduced.

Another advantage of the present invention is that by having independent leading and trailing arms, the vehicle wheels independently maintain continuous contact with the ground throughout all types of terrain, while continuously maintaining the vehicle frame in a level position, thus increasing the stability of the vehicle. In farming usage, where heavy loads are maintained well above the vehicle center of gravity, vehicles utilizing the present invention are substantially less likely to overturn when traversing rough terrain.

Still another advantage of the present invention is that the optional shock assemblies in combination with the independent leading and trailing arms allow for even further load stability.

The combination of the ability of the leading and trailing arms to react independently to rough terrain, the rotation of the walking beam when the leading and trailing arms reach the travel limit of their ability to pivot, and the wear pads and bushings allow for load stability heretofore unachievable in the prior art. The synergy of the combination of these features provides a smoother ride for the operator and increased load capacity in the design of farm vehicles. The optional addition of shock assemblies allows for an even smoother ride.

Other features and advantages of the present invention will be apparent from the following more detailed description of the preferred embodiment, taken in conjunction with the accompanying figures which illustrate, by way of example, the principles of the invention.

All references cited in the preceding sections are incorporated by reference as if fully set forth herein.

DETAILED DESCRIPTION OF THE INVENTION

Whenever possible, the same reference numbers will be used throughout the figures to refer to the same parts.

Figure 1:
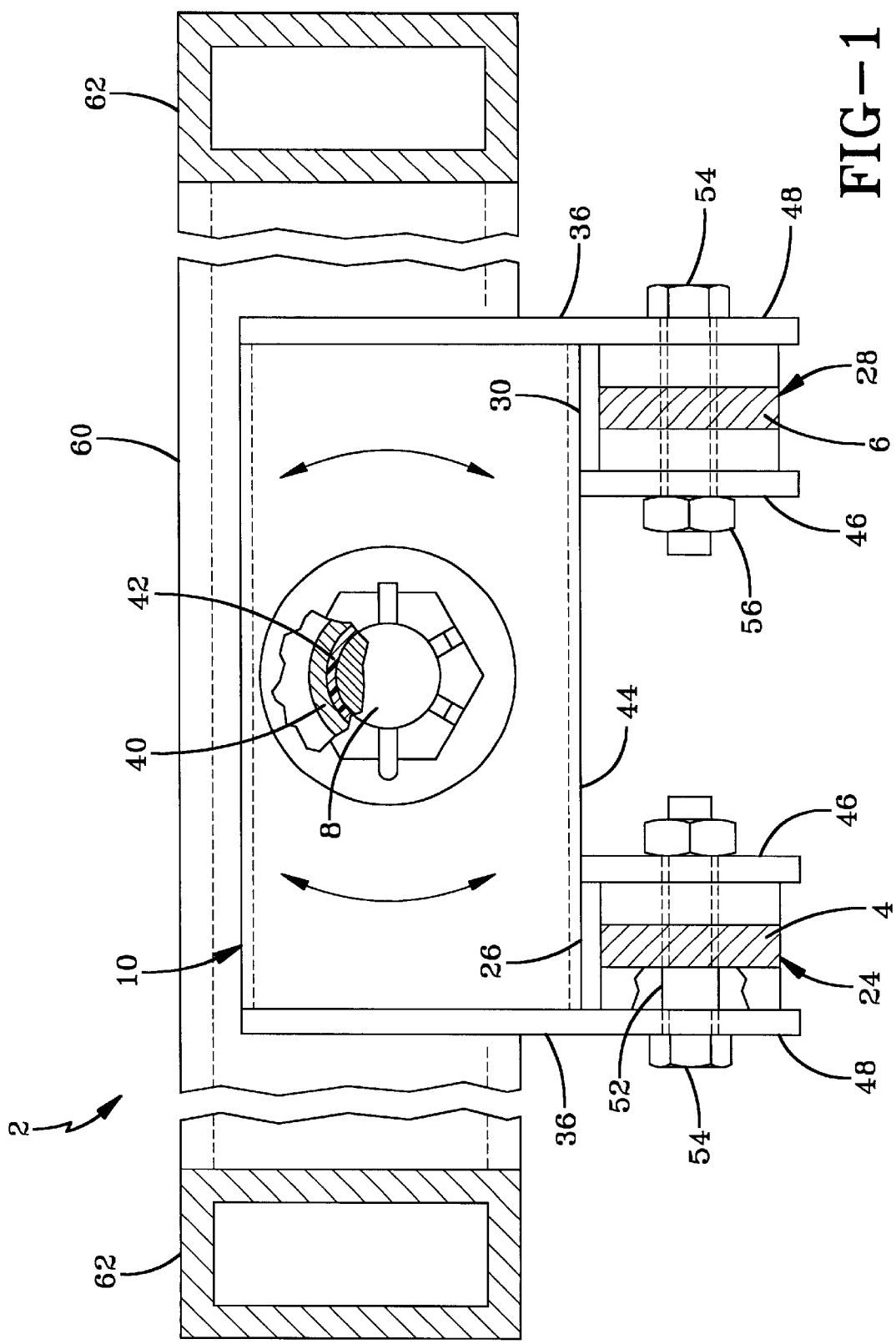
FIG. 1 is an improved suspension of the present invention, viewed from the front.
Figure 2:
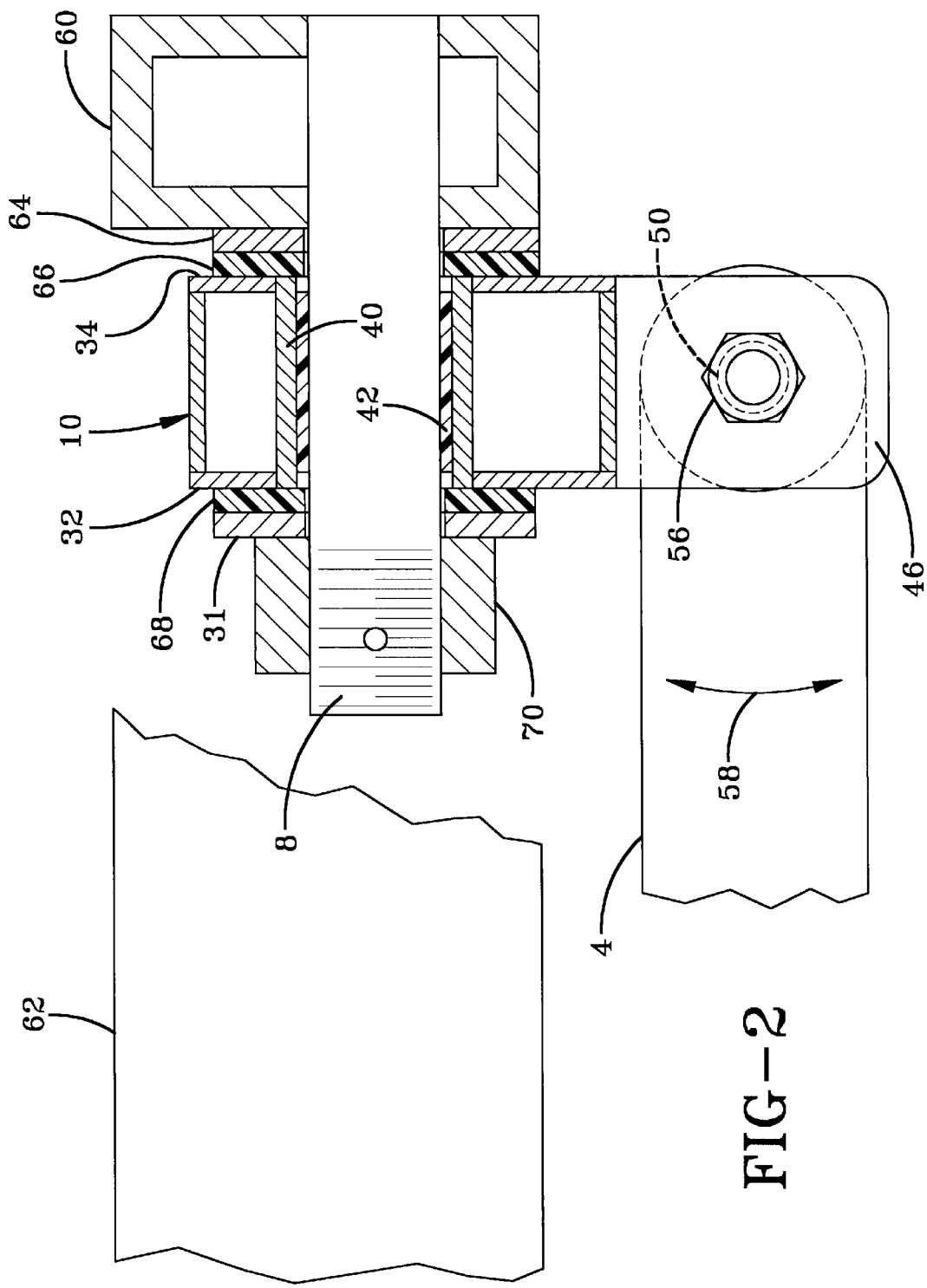
FIG. 2 is a cross sectional side view of the present invention.

Referring now to FIGS. 1, 2 and 3 which show the best presently contemplated mode of the improved vehicle suspension system 2 of the present invention, the apparatus is comprised of a first leading arm 4, a second leading arm 6, a pivot pin 8, a walking beam 10, and a plurality of shock assemblies 12.

The leading arms 4, 6 are manufactured from any strong rigid material such as, for example, steel, magnesium, aluminum, or an alloy having similar properties. The first leading arm second end 14 is fixedly attached to the vehicle axle 16, by way of bolting or welding in close proximity to the right front vehicle hub 18. The second leading arm second end 20 is attached in a similar manner in close proximity to the left front vehicle hub 22. Opposed to each leading arm second end is a leading arm first end. The first leading arm first end 24 is pivotally attached to the walking beam first end 26, and the second leading arm first end 28 is pivotally attached to the walking beam second end 30.

The walking beam 10 is manufactured from materials that have the same properties as the leading arms 4, 6. The walking beam 10 is comprised of a front plate 32 and a rear plate 34 separated by two side plates 36. The walking beam front and rear plates have mating holes (not shown) through which passes a sleeve 40 made of rigid material such as steel, magnesium, aluminum or an alloy having similar properties. Contained within this sleeve is a bushing 42. While the bushing is manufactured from any friction resistant material, for example, nylon or urethane, in the present invention nylon is the material of choice due to its relatively low cost and ease of manufacture.

The walking beam side plates 36 extend below the walking beam bottom edge 44. The walking beam 10 has two additional extensions 46 extending below the walking beam bottom edge 44 in a plane parallel to the walking beam side surface extensions 48, each spaced from a walking beam side surface extensions 48 a sufficient distance so as to receive the leading arm first ends 24, 28. The walking beam side surface extensions 48, walking beam extensions 46, and the leading arm first ends 24, 28 all have a transverse bore 50 positioned such that when the leading arm first ends 24, 28 is mated with the walking beam extension 46 and walking beam side surface extension 48, a bushing 52 made of, for example, urethane, nylon, or other friction resistant material can pass through the bore 50. A bolt 54 is then passed through the bushing 52, allowing for rotation of the trailing arm 4, 6 around the bushing 52. The bolt 54 is secured through the use of a nut 56. In this manner, the leading arms 4, 6 do not oscillate in a transverse direction within the walking beam side surface extension 48 and walking beam extension 46, but rather, are limited to rotate in the direction of the arrow 58 which lies in a plane parallel to the plane formed by the walking beam side surface extension 48.

A cross-member 60 is rigidly secured by, for example, welding or bolting to vehicle frame rails 62. At the center point of the cross-member 60, a pivot pin 8 is rigidly attached and extends outward from the cross-member 60. The pivot pin 8 is of sufficient length to extend beyond the walking beam front plate 32 when the nylon bushing 42 is slid over the pivot pin 8. A wear plate 64 is fixedly attached to the cross-member 60, positioned between the cross-member 60 and the walking beam rear plate 34. Positioned between the wear plate 64 and the walking beam rear plate 34 is a first wear pad 66. The wear pad is comprised of any friction resistant material. The material of choice is nylon due to its relatively low cost and ease of manufacture. A second wear pad 68 of similar material is positioned between the walking beam front plate 32 and a heavy duty washer 31. A castle nut 70 is utilized to keep the walking beam assembly on the pivot pin.

Figure 3B:
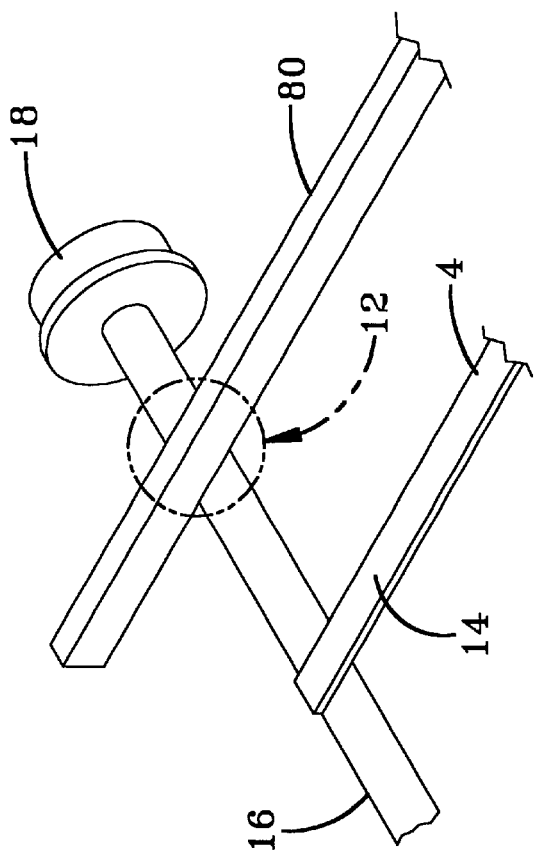
FIGS. 3a and 3b are representations of the relationship of the vehicle axle, vehicle frame and leading arms.
Figure 3A:
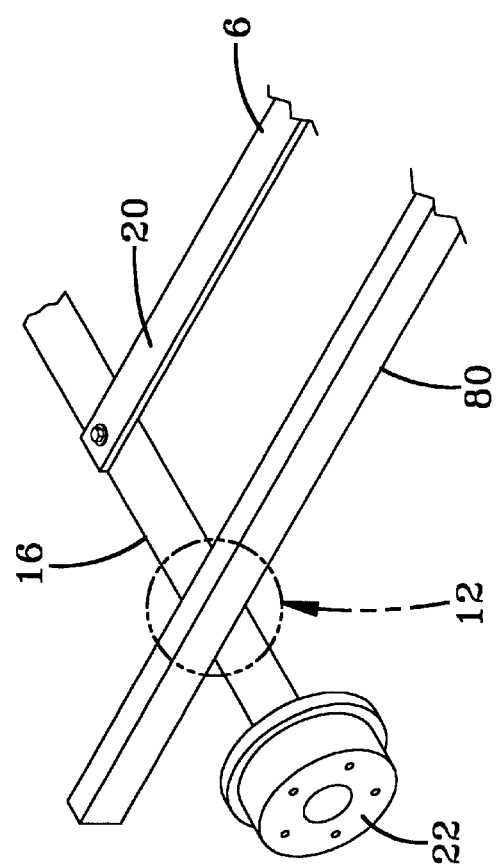

As shown in FIGS. 3a and 3b, positioned between the vehicle axle 16 and the vehicle frame 80 is a shock assembly 12. Alternatively, the shock assembly 12 may be positioned between the leading arms 4, 6 and the vehicle frame 80. The shock assembly 12 may be comprised of, for example, an air baffle, a piston, or a hydraulic suspension with accumulators. The shock assemblies may be comprised of a plurality of pistons. The air baffle may contain one chamber or a multiple number of chambers, with the level of inflation being variable. As the number of chambers increase, the ability to dampen increasing forces correspondingly increases. The horizontal planes of the first and second leading arms are substantially parallel to level ground, thereby substantially reducing the stress on all connecting points.

Referring to the figures, in use, the present invention operates as follows:

As the vehicle traverses rough terrain, when a wheel (not shown) encounters a bump, the leading arm 4, 6 will lift upwards. Much of the force of the bump is dissipated through the use of the shock assembly 12. If both wheels (not shown) encounter the bump simultaneously, both leading arms 4,6 will move upwards at the same time. However, should only one wheel encounter a bump or should one wheel encounter more of a bump than the other, the walking beam and the attached independent leading arms 4, 6 allow the wheels to move upward independently. If the bump is sufficient so as to cause the leading arm 4, 6 to rotate upward to its full extent of travel, the walking beam 10 would then rotate around the pivot pin 8 permitting additional dampening of the forces created. Due to the independent relationship of the rotating walking beam 10 on the pivot pin 8, and each leading arm 4, 6 within the walking beam 10, one leading arm 4 may lift to its travel limit, causing rotation of the walking beam 10, without forcing movement of the other leading arm 6. Thus, regardless of the size of the bump, one wheel may rise while the other remains on level ground, thereby maintaining full contact with both wheels to the ground regardless of the unevenness of the terrain surface.

By maintaining both leading arms 4, 6 substantially parallel to the ground, shearing forces at the pivoting and rotation points are substantially reduced.

Figure 4:
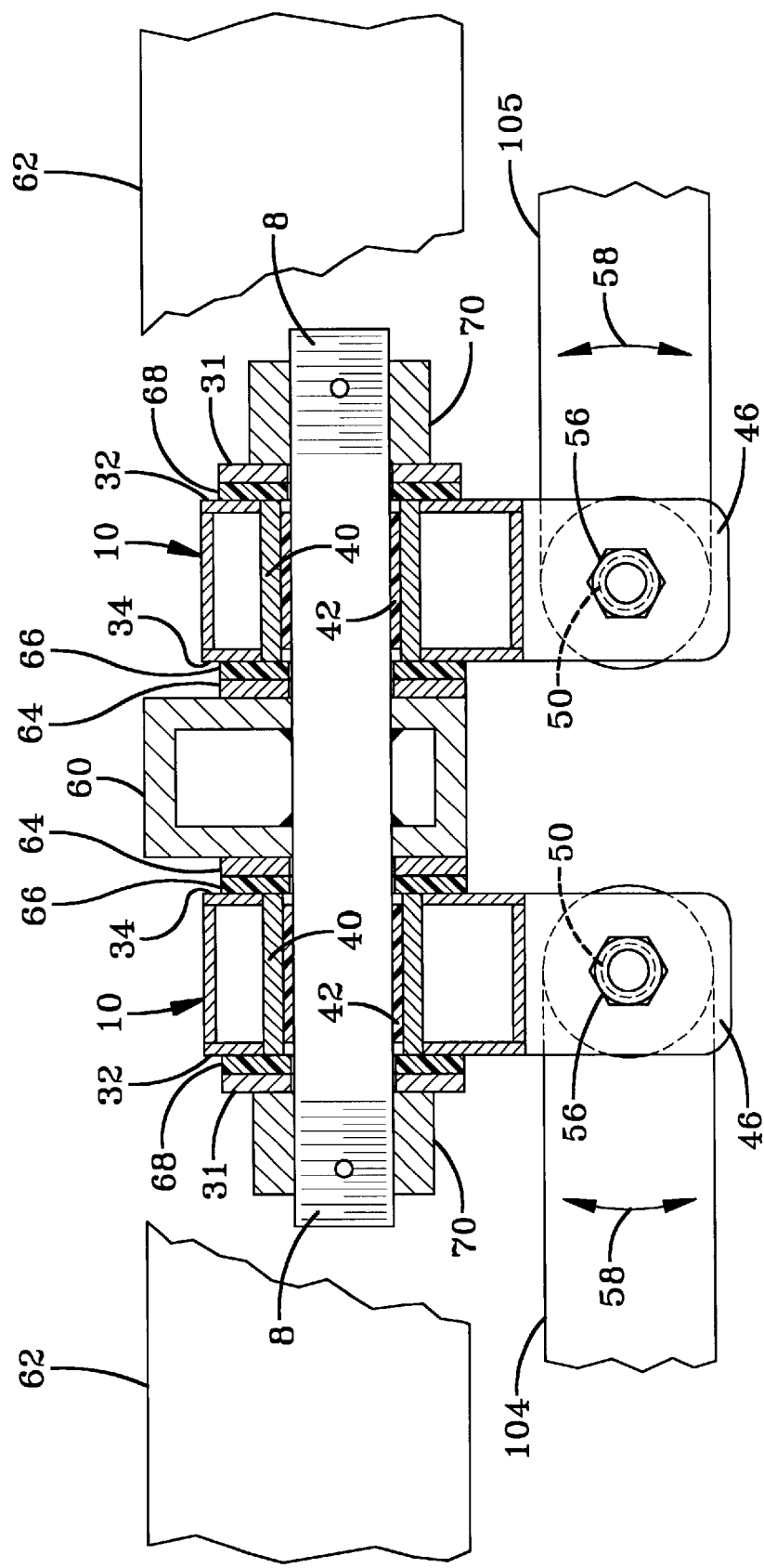
FIG. 4 is a cross sectional view of a second embodiment of the present invention.

In a different embodiment, as shown in FIG. 4, the pivot pin 8 may extend from both sides of the cross-member 60. This may be accomplished by having one pivot pin 8 extend through, yet be rigidly fixed to the cross-member 60, or it may be two separate pivot pins 8 rigidly affixed to each side of the cross-member 60. In this manner, leading arm 104, trailing arm 105 and walking beam 10 arrangements can be provided to all four wheels (not shown) in the manner previously described. It should be apparent that the front and rear assemblies are substantially mirror images in arrangement (although the length of the leading arms, trailing arms and walking beams may vary).

Additionally, while in the preferred embodiment a shock assembly 12 is utilized, the present invention will also work without the use of shock assemblies 12.

It has been found that the synergistic effect of the independently pivoting leading arms, trailing arms and rotating walking beam(s), along with the reduced friction produced by the wear pads and bushings, allow for vehicle load stability heretofore unknown in the art. While not required, the addition of shock assemblies provides for an even smoother ride. As a result, farm vehicles may be designed to carry increased loads over uneven terrain resulting in more efficient farming methods.

Although the present invention has been described in connection with specific examples and embodiments, those skilled in the art will recognize that the present invention is capable of other variations and modification within its scope. For example, the present invention may be utilized in ATV's and other non-farm off-road vehicles.

These examples and embodiments are intended as typical of, rather than limiting the scope of the present invention as presented in the appended claims.

What is claimed is:

1. A suspension system comprising:
a first and second leading arm, each having a first end and an opposed second end;
a pivot pin having a first end and an opposed second end; and
a walking beam having first and second ends, pivotally and wear-resistantly attached to said pivot pin first end at a location between said walking beam first and second ends, said pivot pin second end fixedly attached to a cross-member which is fixedly attached to a vehicle frame, wherein
  said first leading arm first end is pivotally attached to said walking beam first end, said first leading arm second end is fixedly attached to an axle,
  said second leading arm first end is pivotally attached to said walking beam second end, said second leading arm second end is fixedly attached to said axle,
  a substantially horizontal plane that includes the first and the second leading arms is substantially parallel to level ground, and
  at least one shock assembly is fixedly attached between said axle and said vehicle frame.

2. The suspension system of claim 1 wherein the walking beam pivotally attached to said pivot pin first end further comprises:
a wear plate affixed to the cross member;
a sleeve transversing the walking beam, said sleeve including a bushing;
a wear pad proximate each end of said sleeve; and
a castle nut affixed to the pivot pin first end.

3. The suspension system of claim 2 wherein the wear pads and bushing are a friction resistant material, and the sleeve is selected from the group consisting of steel, magnesium and aluminum and the wear plate is steel.

4. The suspension system of claim 3 wherein the wear pads friction resistant material is nylon and the bushing friction resistant material is selected from the group consisting of nylon and urethane.

5. The suspension system of claim 1 wherein each first and second leading arm pivotal attachment to the walking beam comprises:
a transverse bore extending through the first leading arm and the second leading arm;
a first and second pair of extensions to the walking beam to pivotally receive the first and second leading arms, respectively, each pair of extensions including a transverse bore; and
a first friction-resistant bushing extending through the transverse bores of the first leading arm and the first pair of extensions, and a second friction-resistant bushing extending through the transverse bores of the second leading arm and the second pair of extensions, each of said bushings receiving a bolt, and said bolt threadably receiving a nut.

6. The suspension system of claim 1 wherein the first and second leading arm second ends are each welded to the axle.

7. The suspension system of claim 1 wherein the first and second leading arm second ends are each bolted to the axle.

8. The suspension system of claim 1 wherein the shock assemblies are comprised of a plurality of pistons.

9. A suspension system comprising:
a first and second leading arm, each having a first end and an opposed second end;
a pivot pin having a first end and an opposed second end; and
a walking beam having first and second ends, pivotally and wear-resistantly attached to said pivot pin first end at a location between said walking beam first and second ends, said pivot pin second end fixedly attached to a cross-member fixedly attached to a vehicle frame, wherein
  said first leading arm first end is pivotally attached to said walking beam first end, said first leading arm second end is fixedly attached to an axle,
  said second leading arm first end is pivotally attached to said walking beam second end, said second leading arm second end is fixedly attached to said axle, and
  a substantially horizontal plane that includes said first and second leading arms is substantially parallel to level ground.

10. The suspension system of claim 9 wherein the walking beam pivotal attachment further comprises:
a wear plate affixed to the cross member;
a sleeve transversing the walking beam, said sleeve including a bushing; a wear pad proximate each end of said sleeve; and a castle nut affixed to the pivot pin first end.

11. The suspension system of claim 10 wherein the wear pads and bushing are a friction resistant material, the sleeve is selected from the group consisting of steel, magnesium and aluminum and the wear plate is steel.

12. The suspension system of claim 11 wherein the wear pads friction resistant material is nylon and the bushing friction resistant material is selected from the group consisting of nylon and urethane.

13. The suspension system of claim 9 wherein each first and second leading arm pivotal attachment to the walking beam comprises:
   a transverse bore extending through the first leading arm and the second leading arm;
   a first and second pair of extensions to the walking beam to pivotally receive the first and second leading arms, respectively, each pair of extensions including a transverse bore; and
   a first friction-resistant bushing extending through the transverse bores of the first leading arm and the first pair of extensions, and a second friction-resistant bushing extending through the transverse bores of the second leading arm and the second pair of extensions, each of said bushings receiving a bolt, and said bolt threadably receiving a nut.

14. The suspension system of claim 9 wherein the first and second leading arm second ends are each welded to the axle.

15. The suspension system of claim 9 wherein the first and second leading arm second ends are each bolted to the axle.

16. A suspension system comprising:
   a first and second leading arm, each having a first end and an opposed second end;
   a first and second trailing arm, each having a first end and an opposed second end;
   a first walking beam having first and second ends;
   a second walking beam having first and second ends; and
   at least one pivot pin attached to a cross-member which is fixedly attached to a vehicle frame, such that a first extending end of said pivot pin extends outward from a first side of said cross-member and a second extending end of said pivot pin extends outward from an opposing side of said cross-member, wherein
   said first walking beam is pivotally and wear-resistantly attached to said pivot pin first extending end at a location between said first walking beam first and second ends,
   said second walking beam is pivotally and wear-resistantly attached to said pivot pin second extending end at a location between said second walking beam first and second ends, wherein
   said first leading arm first end is pivotally attached to said first walking beam first end, said first leading arm second end is fixedly attached to axle,
   said second leading arm first end is pivotally attached to said first walking beam second end, said second leading arm second end is fixedly attached to said first axle,
   said first trailing arm first end is pivotally attached to said second walking beam first end, said first trailing arm second end is fixedly attached to a second axle,
   said second trailing arm first end is pivotally attached to said second walking beam second end, said second trailing arm second end is fixedly attached to said second axle,
   substantially horizontal planes of said leading and trailing arms are substantially parallel to level ground, and
   at least one shock assembly is fixedly attached between said first and second axle and said vehicle frame.

17. The suspension system of claim 16 wherein the first and second walking beam pivotal attachment each comprises a wear plate fixed to the cross member; a sleeve transversing the respective walking beam, said sleeve including a bushing; a wear pad proximate each end of said sleeve; and a castle nut affixed to the respective pivot pin.

18. The suspension system of claim 17 wherein the wear pads and bushings are a friction resistant material, the sleeves are selected from the group consisting of steel, aluminum and magnesium and the wear plates are steel.

19. The suspension system of claim 18 wherein the wear pads friction resistant material is nylon and the bushings friction resistant material is selected from the group consisting of nylon and urethane.

20. The suspension system of claim 16 wherein each walking beam includes a first pair of extensions and a second pair of extensions, and the first and the second leading arm pivotal attachment and the first and the second trailing arm pivotal attachment to the respective first and the second walking beam each comprises pivotally fitting the first and the second leading arm and the first and the second trailing arm between the respective pair of extensions of the respective first and second walking beam, the first and the second leading arm, the first and the second trailing arm and the respective pair of extensions including a transverse bore for receiving a friction-resistant bushing, said bushing receiving a bolt, said bolt threadingly receiving a nut.

21. The suspension system of claim 16 wherein the second ends of the leading arms are affixed to the first axle, and the second ends of the trailing arms are affixed to the second axle by at least one of the affxing means selected from the group consisting of welding and bolting.

* * * * *